(12) United States Patent
Nedachi et al.

(10) Patent No.: US 8,166,840 B2
(45) Date of Patent: May 1, 2012

(54) TWIN CLUTCH TYPE SPEED CHANGE CONTROL SYSTEM

(75) Inventors: Yoshiaki Nedachi, Saitama (JP); Takashi Ozeki, Saitama (JP); Yoshiaki Tsukada, Saitama (JP); Hiroyuki Kojima, Saitama (JP); Kazuyuki Fukaya, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 814 days.

(21) Appl. No.: 12/235,119

(22) Filed: Sep. 22, 2008

(65) Prior Publication Data

US 2009/0078069 A1 Mar. 26, 2009

(30) Foreign Application Priority Data

Sep. 25, 2007 (JP) ................................. 2007-247299

(51) Int. Cl.
*F16H 3/08* (2006.01)
*F16D 21/00* (2006.01)
*F16D 39/00* (2006.01)
*F16D 43/00* (2006.01)

(52) U.S. Cl. ............................ 74/330; 74/331; 192/48.1
(58) Field of Classification Search ..................... 74/330, 74/331; 192/48.1, 48.2, 48.7
See application file for complete search history.

(56) References Cited

U.S. PATENT DOCUMENTS

| | | | |
|---|---|---|---|
| 2007/0144858 A1* | 6/2007 | Ieda et al. | 192/48.8 |
| 2007/0193843 A1* | 8/2007 | Uhler et al. | 192/48.8 |
| 2008/0026910 A1* | 1/2008 | Honma et al. | 477/149 |
| 2008/0087119 A1* | 4/2008 | Shiozaki | 74/330 |
| 2008/0305931 A1* | 12/2008 | Eich et al. | 477/174 |

FOREIGN PATENT DOCUMENTS

| | | |
|---|---|---|
| DE | 197 51 456 A1 | 5/1999 |
| DE | 100 56 954 A1 | 5/2002 |
| DE | 10 2006 008 207 A1 | 9/2006 |
| EP | 1 617 110 A1 | 1/2006 |
| EP | 1 803 958 A2 | 7/2007 |
| JP | 2005-265159 A | 9/2005 |
| JP | 2007-177904 A | 7/2007 |

* cited by examiner

*Primary Examiner* — Tisha Lewis
(74) *Attorney, Agent, or Firm* — Birch, Stewart, Kolasch & Birch, LLP

(57) ABSTRACT

In a twin clutch type speed change control system in which changeover of gear position is carried out by switching between a pair of clutches, to suppress the noises of clutch being in the disengaged condition during a normal operation with a fixed gear position. In the twin clutch type speed change control system, changeover of gear position between an odd-ordinal gear position and an even-ordinal gear position is effected by disengaging an engaged clutch and engaging a disengaged clutch. During the normal operation with a fixed gear position, the clutch being in the disengaged condition is supplied with a minute oil pressure toward the clutch engaging side, whereby the clutch is moved by a minute amount toward the clutch engaging side.

20 Claims, 6 Drawing Sheets

TWIN CLUTCH TYPE SPEED CHANGE CONTROL SYSTEM

CROSS-REFERENCE TO RELATED APPLICATIONS

The present application claims priority under 35 USC 119 to Japanese Patent Application No. 2007-247299 filed on Sep. 25, 2007 the entire contents of which are hereby incorporated by reference.

BACKGROUND OF THE INVENTION

1. Field of the Invention

The present invention relates to a twin clutch type speed change control system suitable for use in a vehicle such as a motorcycle.

2. Description of Background Art

Conventionally, a twin clutch type speed change control system is known that includes a transmission mechanism having a plurality of gear trains for odd-ordinal gear positions and even-ordinal gear positions. A pair of clutches are linked respectively to both of the odd-ordinal and even-ordinal gear position gear trains. The transmission mechanism is capable of power transmission by selectively using one of the gear trains wherein one of the clutches is engaged and the other of the clutches is disengaged during a normal operation with a fixed gear position so as to transmit power by use of one of the gear trains linked to the engaged clutch and to develop a condition where power transmission can be performed by use of a preliminarily selected one of the gear trains linked to the disengaged clutch. Starting from this condition, the engaged clutch is disengaged and the disengaged clutch is engaged, whereby changeover between the odd-ordinal gear position and the even-ordinal gear position is performed. See, for example, Japanese Patent Laid-Open No. 2007-177904.

The transmission mechanism can perform power transmission by selectively using one of the gear trains through a process in which a slide member rotated as one body with a support shaft in each of the gear trains is mutually non-rotatably engaged with a free gear mutually rotatable in relation to the support shaft.

During the above-mentioned normal operation, in the disengaged clutch, a component part on the drive source side is rotated idly relative to a component part on the gear train side. In this instance, a sound based on a mechanical play between the component part on the drive source side and the component part on the gear train side may be generated. A need exists for an improvement with respect to the sound generated.

SUMMARY AND OBJECTS OF THE INVENTION

Accordingly, it is an object of an embodiment of the present invention is to reduce the sound generated in the clutch being in a disengaged condition during a normal operation with a fixed gear position, in a twin clutch type speed change control system in which changeover of gear position is carried out by switching between a pair of clutches.

As means for solving the above problem, according to an embodiment of the present invention a twin clutch type speed change control system includes a transmission mechanism 47 having a plurality of gear trains, for example, speed change gear pairs 45a to 45f, for odd-ordinal gear positions and even-ordinal gear positions. A pair of clutches, for example, first and second disk clutches 51a and 51b in the embodiment, are provided that are linked respectively to both the odd-ordinal and even-ordinal gear position gear trains with the transmission mechanism being capable of power transmission by selectively using one of the gear trains. One of the clutches is engaged and the other of the clutches is disengaged during a normal operation with a fixed gear position so as to transmit power by use of one of the gear trains linked to the engaged clutch and to develop a condition where power transmission can be performed by use of a preliminarily selected one of the gear trains linked to the disengaged clutch. Starting from this condition, the engaged clutch is disengaged and the disengaged clutch is engaged so as thereby perform a changeover between the odd-ordinal gear position and the even-ordinal gear position. During the normal operation, the formerly disengaged clutch is moved by a minute amount toward the clutch engaging side.

According to an embodiment of the present invention, each of the clutches is an oil hydraulic clutch which exhibits an engaging force based on oil pressure supplied externally, and, during the normal operation, the disengaged clutch is supplied with a minute oil pressure, for example, a minute oil pressure P1, toward the clutch engaging side.

According to an embodiment of the present invention, each of the clutches is a multiple disk clutch having a plurality of clutch disks 61a, 61b and clutch plates 66a, 66b.

According to an embodiment of the present invention, during the normal operation with a fixed gear position, the clutch being in the disengaged condition is moved by a minute amount toward the clutch engaging side, whereby the play in the rotating direction between a component part on the driving source side of the clutch and a component part on the gear train side of the clutch can be reduced, so that the sound generated based on the play during the normal operation can be reduced. This effect is augmented especially where the clutches are each a multiple disk clutch having a plurality of clutch disks.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
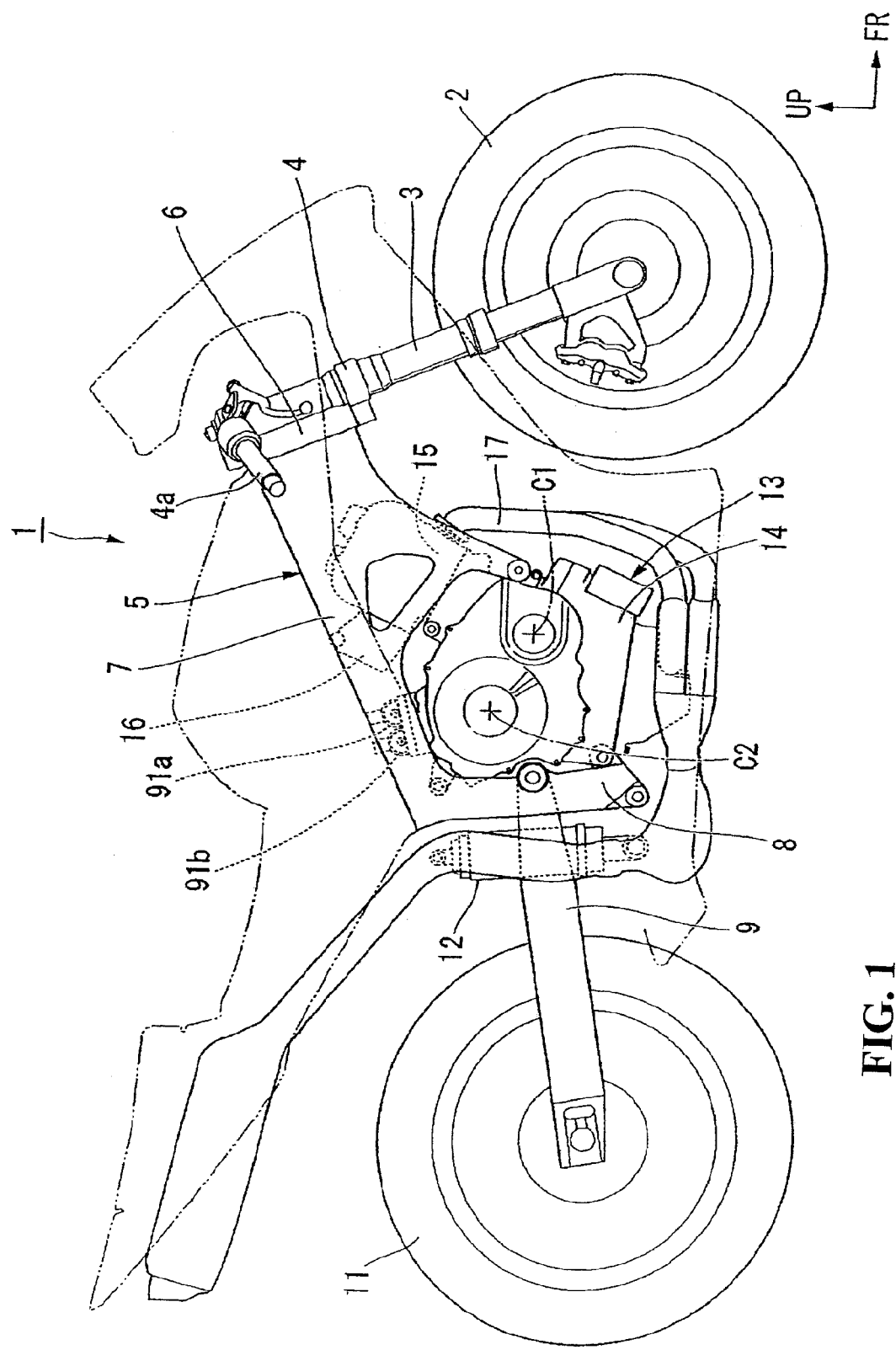
FIG. 1 is a right side view of a motorcycle in an embodiment of the present invention.

Now, an embodiment of the present invention will be described below referring to the drawings. The front, rear, left, right and the like sides (directions) in the following description are the same as the sides (directions) with respect to a vehicle unless otherwise specified. In addition, arrow FR in the drawings indicates the front side of the vehicle, arrow LH indicates the left-hand side of the vehicle, and arrow UP indicates the upper side of the vehicle.

As shown in FIG. 1, an upper part of a front fork 3 for rotatably supporting a front wheel 2 in a motorcycle (saddle ride type vehicle) 1 is steerably supported by a head pipe 6 provided at a front end part of a body frame 5, through a steering stem 4. A steering handle 4a is attached to an upper part of the steering stem 4 (or the front fork 3). From the head pipe 6, a main frame 7 extends to the rear, to be connected to pivot plates 8. Front end parts of swing arms 9 are vertically swingably supported on the pivot plates 8, and a rear wheel 11 is rotatably supported on rear end parts of the swing arms 9. A shock absorber 12 is interposed between the swing arm 9 and the body frame 5. On the inner side of the body frame 5, an engine (internal combustion engine) 13 as a prime mover of the motorcycle 1 is suspended.

Figure 2:
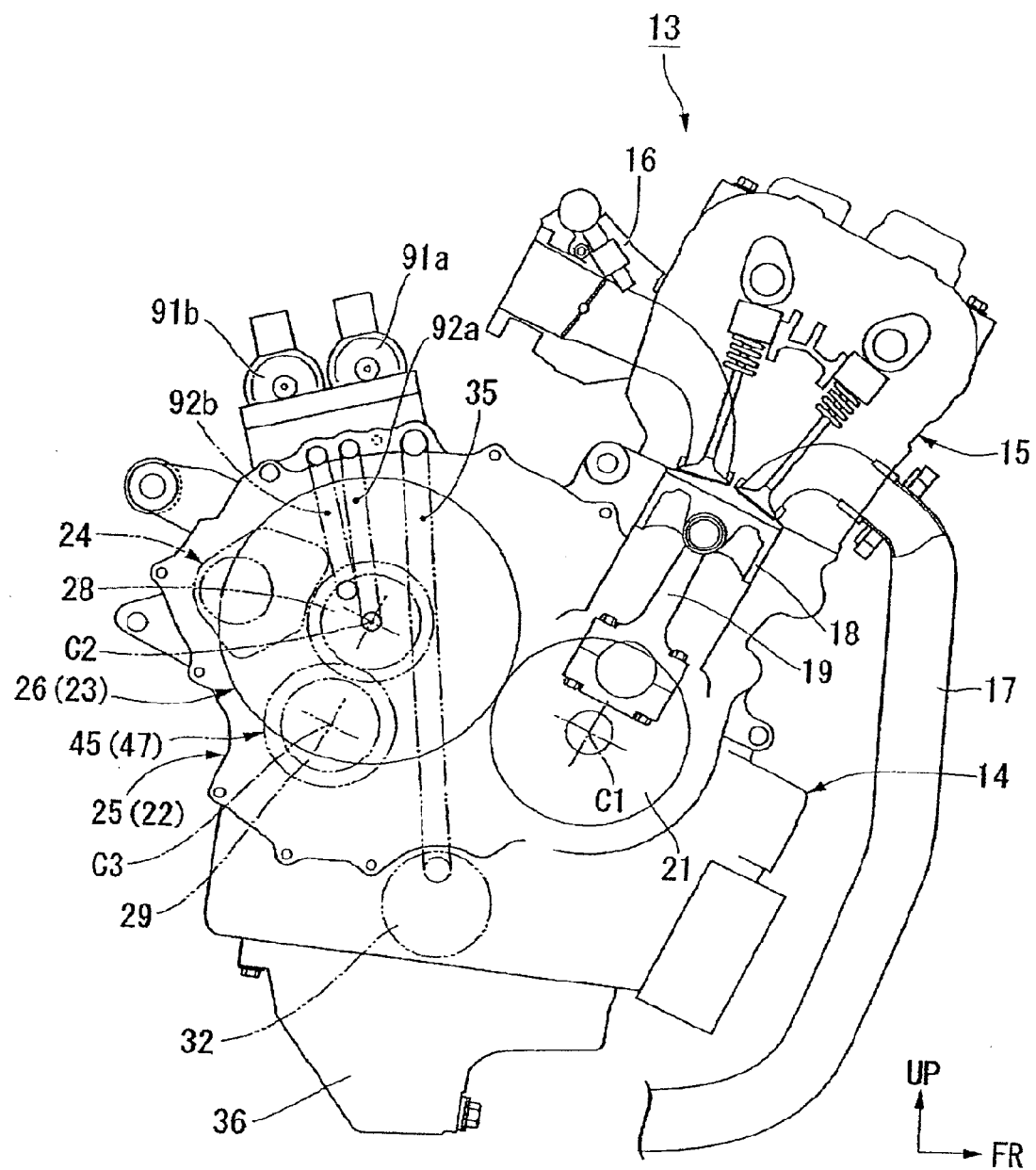
FIG. 2 is a right side view of an engine in the motorcycle.

Referring to FIG. 2, the engine 13 is a parallel four-cylinder engine with a rotational center axis C1 of a crankshaft 21 set in the vehicle width direction (left-right direction), wherein cylinders 15 are erectly provided on a crankcase 14, a corresponding piston 18 is reciprocatably fitted in each of the cylinders 15, and reciprocation of each piston 18 is converted into rotation of the crankshaft 21 through connecting rods 19. A throttle body 16 is connected to a rear part of the cylinder 15, and an exhaust pipe 17 is connected to a front part of the cylinder 15.

A transmission case 22 is provided on the rear side of and integrally with the crankcase 14. A twin clutch type transmission 23 and a change mechanism 24 are contained in the transmission case 22. A right side part of the transmission case 22 is made to be a clutch case 25, and twin clutches 26 of the twin clutch type transmission 23 are contained in the clutch case 25. Rotational power of the crankshaft 21 serving as a motive power source of the engine 13 is outputted to the left side of the transmission case 22 through the twin clutch type transmission 23, and is transmitted to the rear wheel 11 through a power transmission mechanism of a chain type, for example. The symbols C2 and C3, respectively, denote rotational center axes of a main shaft 28 and a counter shaft 29 of the twin clutch type transmission 23.

Figure 3:
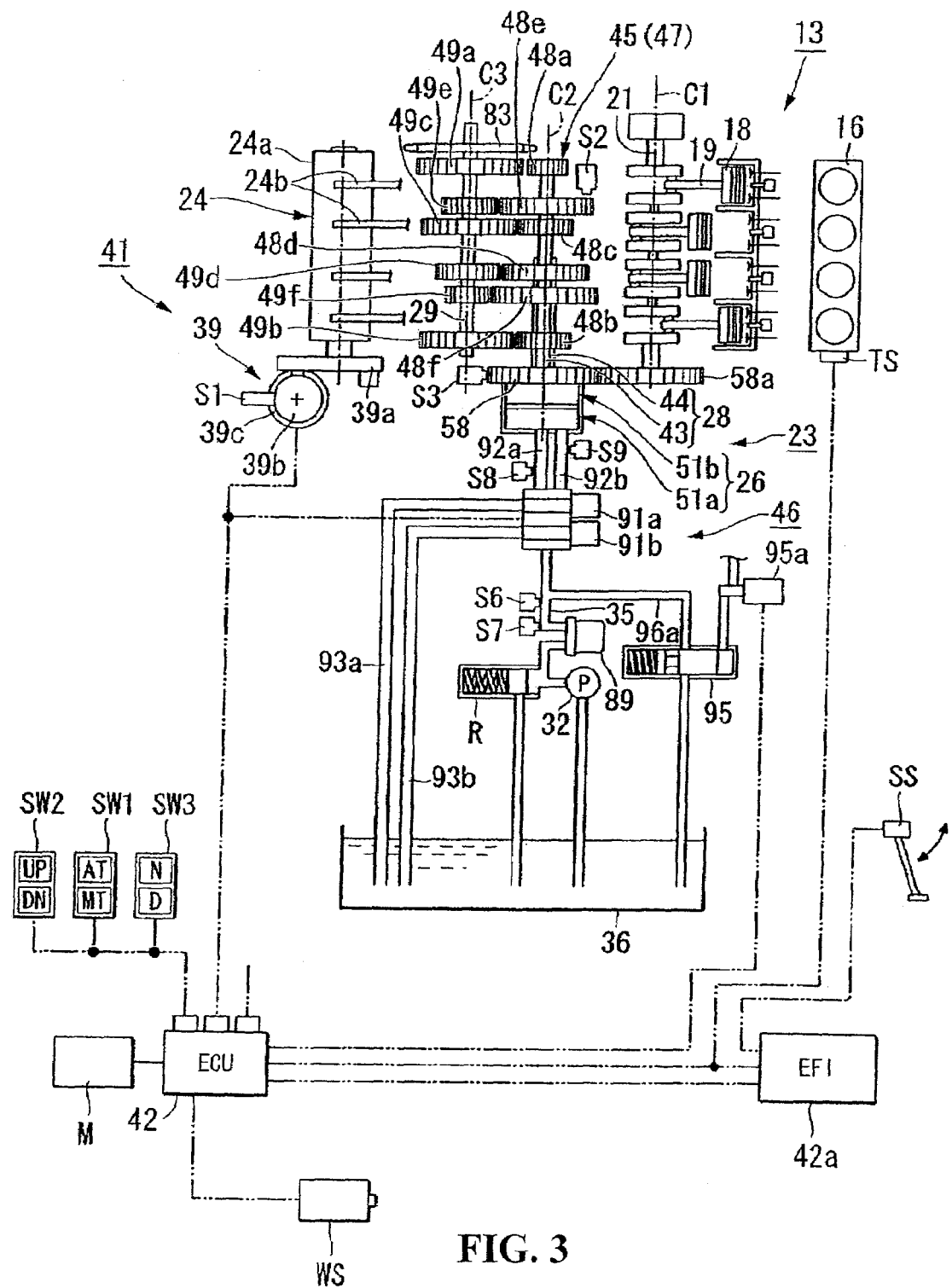
FIG. 3 is a block diagram of a twin clutch type speed change control system of the motorcycle.

As shown in FIG. 3, the motorcycle 1 is provided with a twin clutch type speed change control system which mainly includes the twin clutch type transmission 23 provided in connection with the engine 13, a gear shift device 41 configured by providing the change mechanism 24 with a driving mechanism 39, and an electronic control unit (ECU) 42 for controlling the operations of the twin clutch type transmission 23 and the gear shift device 41.

Figure 4:
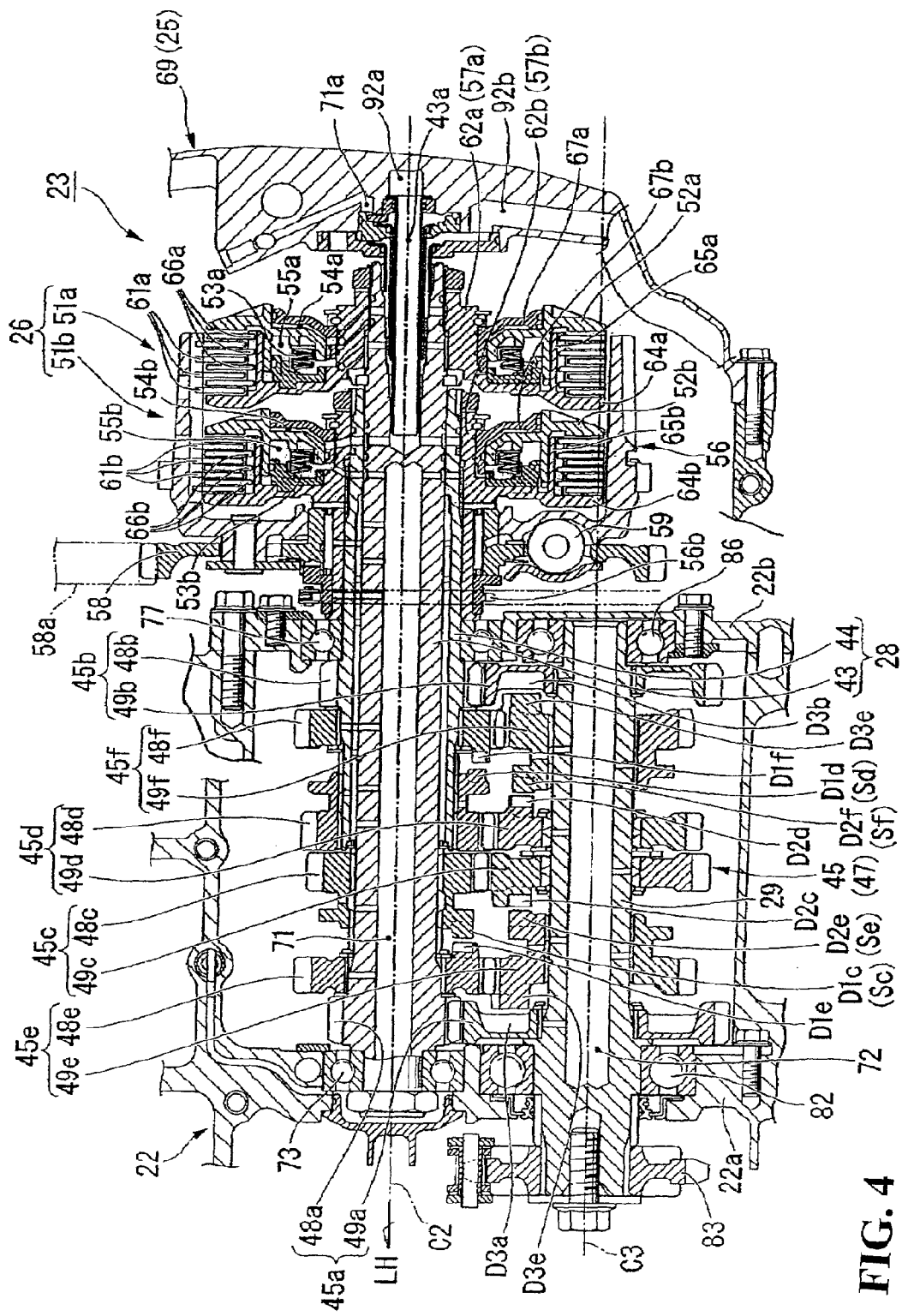
FIG. 4 is a sectional view of a twin clutch type transmission of the motorcycle.

Referring to FIG. 4 also, the twin clutch type transmission 23 includes the main shaft 28 having a double structure composed of inner and outer shafts 43, 44 with the counter shaft 29 disposed in parallel to the main shaft 28. A speed change gear group 45 is disposed bridgingly between the main shaft 28 and the counter shaft 29. The twin clutches 26 are coaxially disposed at a right end part of the main shaft 28 with an oil pressure supply system 46 for supplying a working oil pressure to the twin clutches 26. Hereinafter, the assembly composed of the main shaft 28, the counter shaft 29 and the speed change gear group 45 is referred to as transmission 47.

The main shaft 28 has a structure in which a right end part of the inner shaft 43 extending bridgingly between left and right parts of the transmission case 22 is mutually rotatably inserted in the outer shaft 44. On the outer peripheries of the inner and outer shafts 43, 44, drive gears 48a to 48f for six gear speeds in the speed change gear group 45 are distributed. On the other hand, driven gears 49a to 49f for six gear speeds in the speed change gear group 45 are disposed on the outer periphery of the counter shaft 29. The drive gears 48a to 48f and the driven gears 49a to 49f are meshed with each other on the basis of each gear position, to constitute speed change gear pairs 45a to 45f corresponding to the gear positions, respectively. The speed change gear pairs 45a to 45f are decreased in their reduction gear ratio (with the higher-speed gears providing an increase in speed) in the order of from the 1st gear speed to 6th gear speed.

A left end part of the inner shaft 43 reaches a left side wall 22a of the transmission case 22, and is rotatably borne on the left side wall 22a through a ball bearing 73.

On the other hand, a right side part of the inner shaft 43 penetrates a right side wall 22b of the transmission case 22 to be exposed inside the clutch case 25, and an intermediate part in the left-right direction of the inner shaft 43 is rotatably borne on the right side wall 22b of the transmission case 22 through an intermediate part in the left-right direction of the outer shaft 44 penetrating the right side wall 22b and through a ball bearing 77.

The outer shaft 44 is shorter than the inner shaft 43, and its left end part is terminated at an intermediate part in the left-right direction of the transmission case 22. On that portion of the outer shaft 44 which is located on the left side relative to the right side wall 22b, the driven gears 48b, 48d and 48f corresponding to even-ordinal gear positions (2nd, 4th and 6th speeds) in the speed change gear group 45 are supported in the order of 4th speed, 6th speed and 2nd speed from the left side. On the other hand, on that portion of the inner shaft 43 which is located on the left side of a left end part of the outer shaft 44, the drive gears 48a, 48c and 48e corresponding to odd-ordinal gear positions (1st, 3rd and 5th speeds) in the speed change gear group 45 are supported in the order of 1st speed, 5th speed and 3rd speed from the left side.

Left and right end parts of the counter shaft 29 are rotatably borne on the left and right side walls 22a, 22b of the transmission case 22 through ball bearings 82, 86, respectively. The left end part of the counter shaft 29 protrudes to the left side of the left side wall 22a, and a drive sprocket 83 of the power transmission mechanism for transmission of power to the rear wheel 11 is attached to the left end part.

The driven gears 49a to 49f in the speed change gear group 45 corresponding respectively to the gear positions are borne on that portion of the counter shaft 29 which are located on the inner side of the transmission case 22, in the same order as the drive gears 48a to 48f.

Main feed oil passages 71, 72 capable of supplying an oil pressure from a main oil pump (not shown) for a pressure feed of oil to parts in the engine 13 are formed respectively in the main shaft 28 (inner shaft 43) and the counter shaft 29, and engine oil is appropriately supplied to the speed change gear group 45 through the main oil passages 71, 72.

The twin clutches 26 has oil hydraulic type first and second disk clutches (hereinafter they will in some cases be referred to simply as clutches) 51a, 51b disposed coaxially with and adjacently to each other, and the inner and outer shafts 43, 44 are coaxially connected respectively to the clutches 51a, 51b. A primary driven gear 58 meshed with a primary drive gear 58a on the crankshaft 21 is coaxially provided on a clutch outer 56 possessed in common by the clutches 51a, 51b, and a rotational drive force from the crankshaft 21 is inputted to the clutch outer 56 through the gears 58, 58a. The rotational drive force inputted to the clutch outer 56 is transmitted individually to the inner and outer shafts 43, 44 according to the engaged/disengaged conditions of the clutches 51a, 51b. The engaged/disengaged conditions of the clutches 51a, 51b are individually controlled by the presence/absence of an oil pressure supplied from the above-mentioned oil pressure supply system 46.

One of the clutches 51a, 51b is engaged whereas the other is disengaged, and power transmission in the transmission 47 is performed by use of one of the speed change gear pair linked to one of the inner and outer shafts 43, 44. In addition, the speed change gear pair to be used next is preliminarily selected from among the speed change gear pairs linked to the other of the inner and outer shafts 43, 44, and, starting from this condition, one of the clutches 51a, 51b is disengaged whereas the other is engaged, whereby the power transmission in the transmission 47 is changed over to that made by use of the preliminarily selected speed change gear pair, resulting in upshift or downshift in the transmission 47.

As shown in FIG. 3, the oil pressure supply system 46 includes a clutch oil pump 32 as an oil pressure generation source for the twin clutches 26 with an feed oil passage 35 extending from a discharge port of the clutch oil pump 32. First and second clutch actuators 91a, 91b are connected to the downstream side of the feed oil passage 35. First and second supply oil passages 92a, 92b extend from the clutch actuators 91a, 91b to engaging-side oil pressure chambers 54a, 54b (see FIG. 4) of the clutches 51a, 51b.

The clutch oil pump 32 is provided separately from the main oil pump, and operates to suck in the engine oil reserved in an oil pan 36 on the lower side of the crankcase 14 and to discharge the oil into the feed oil passage 35. An oil filter 89 for exclusive use in the oil passage is provided in the feed oil passage 35.

Symbols S6 and S7 denote an oil pressure sensor and an oil temperature sensor for detecting the oil pressure and the oil temperature in the feed oil passage 35. Symbol R denotes a relief valve for controlling the rise in the oil pressure inside the feed oil passage 35 and symbols S8, S9 denote oil pressure sensors for detecting the oil pressures in the supply oil passages 92a, 92b, i.e., the pressures of the oils fed to the clutches 51a, 51b.

Communication of the feed oil passage 35 and the first and second supply oil passages 92a, 92b can be individually made by operation of the clutch actuators 91a, 91b. When the feed oil passage 35 and the first supply oil passage 92a are made to communicate with each other through the first clutch actuator 91a, a comparatively high oil pressure from the clutch oil pump 32 is supplied through the first supply oil passage 92a into the engaging-side oil pressure chamber 54a of the first clutch 51a, whereby the first clutch 51a is engaged. On the other hand, when the feed oil passage 35 and the second supply oil passage 92b are made to communicate with each other through the second clutch actuator 91b, the oil pressure from the clutch oil pump 32 is supplied through the second supply oil passage 92b into the engaging-side oil pressure chamber 54b of the second clutch 51b, whereby the second clutch 51b is engaged.

An oil pressure relief oil passage 96a provided with an oil pressure relief valve 95 is branched from the feed oil passage 35. The oil pressure relief valve 95 is operated by a valve actuator 95a to changeover between the opening and closing of the oil pressure relief oil passage 96a. The valve actuator 95a is controlled by the electronic control unit 42 so as to operate as follows. For example, at the time of starting the engine, the valve actuator 95a opens the oil pressure relief oil passage 96a, whereby the feed oil pressure from the clutch oil pump 32 is returned into the oil pan 36, and, after the starting of the engine, the valve actuator 95a closes the oil pressure relief oil passage 96a so that the feed oil pressure can be supplied to the twin clutches 26.

The clutch actuators 91a, 91b are provided respectively with return oil passages 93a, 93b for returning the oil pressure from the clutch oil pump 32 into the oil pan when the communication between the feed oil passage 35 and the first and second supply oil passages 92a, 92b is interrupted.

Figure 5:
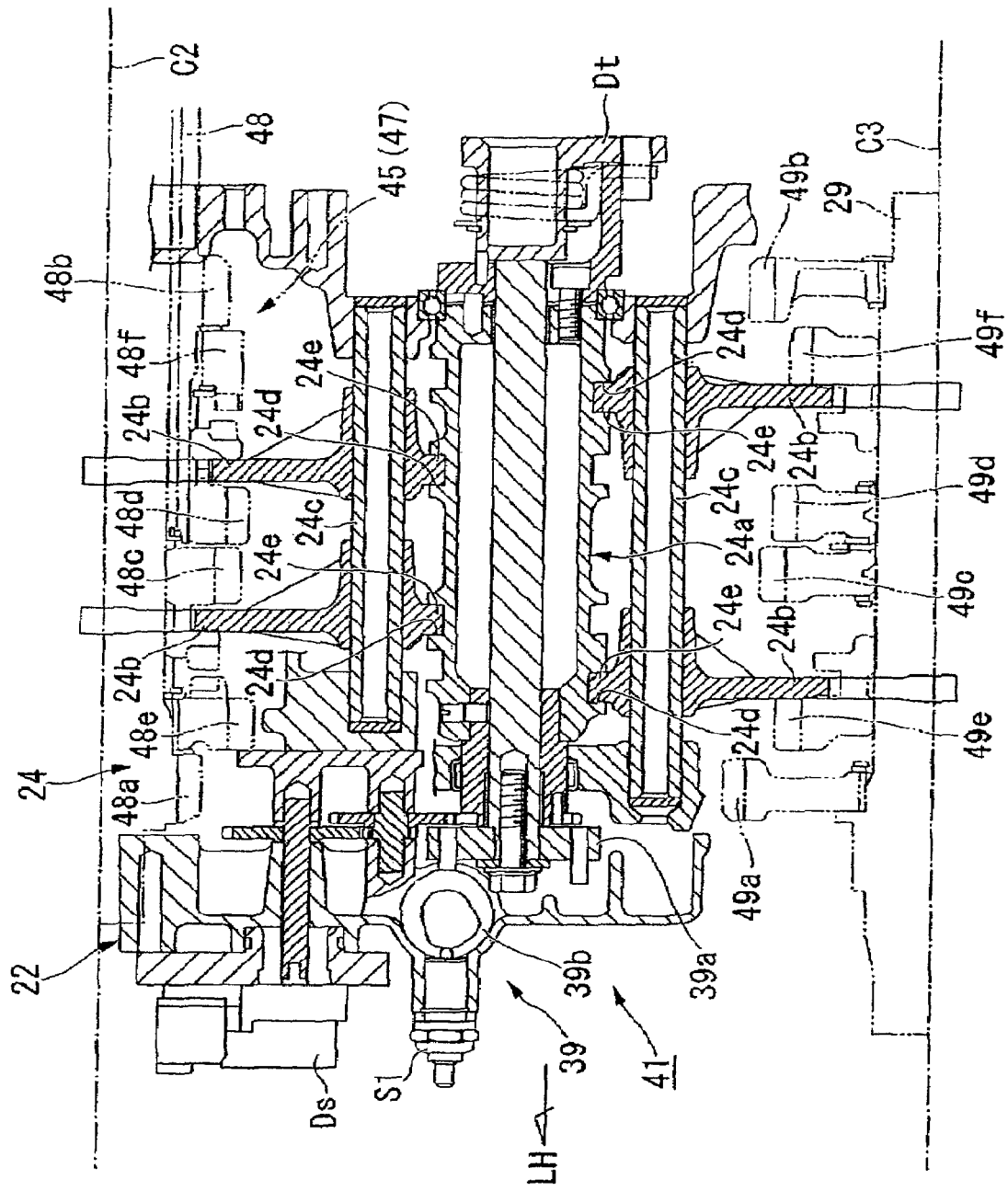
FIG. 5 is a sectional view of a change mechanism for operating the twin clutch type transmission.

As shown in FIGS. 3 and 5, the change mechanism 24 moves in the axial direction a plurality of (in this embodiment, four) shift forks 24b by rotation of a shift drum 24a disposed in parallel to the shafts 28, 29, whereby the speed change gear pair (gear position) used for power transmission between the main shaft 28 and the counter shaft 29 is changed over.

Of the shift forks 24b, one that extends to the side of the main shaft 28 and one that extends to the side of the counter shaft 29 constitute a pair, and the base end sides of these shift forks 24b are axially movably supported by a pair of shift fork rods 24c, respectively. Each of the shift forks 24b is provided on the base end side thereof with a slide projection 24e for engagement with one of a plurality of cam grooves 24d provided in the outer periphery of the shift drum 24a. Each of the shift forks 24b has tip parts thereof engaged with a slide gear (described later) in the speed change gear group 45, on the side of the main shaft 28 and on the side of the counter shaft 29. At the time of rotation of the shift drum 24a, each shift fork 24b is moved in the axial direction according to the pattern of each cam groove 24d, and the slide gear is moved in the axial direction, whereby the gear position in the transmission 47 is changed.

The above-mentioned drive mechanism 39 is provided on one end side of the shift drum 24a. The drive mechanism 39 includes a pin gear 39a coaxially fixed to the shift drum 24a in the change mechanism 24, a worm-shaped barrel cam 39b engaged with the pin gear 39a and an electric motor 39c for giving a rotational drive force to the barrel cam 39b. By driving the electric motor 39c, the shift drum 24a is rotated appropriately, whereby the gear position in the transmission 47 is changed.

Symbol S1 denotes a sensor for detecting the operating (moving) amount of the drive mechanism 39 for detecting the gear position in the transmission 47, symbol DS denotes a rotational angle sensor for detecting the actual rotating angle of the shift drum 24a and symbol DT denotes a detent for restricting the rotating angle on a gear position basis of the shift drum 24a.

As shown in FIG. 4, the transmission 47 is of the normally meshed type in which each of the drive gears 48a to 48f and each of the driven gears 49a to 49f corresponding to each of the gear positions are normally meshed with each other. The gears are largely classified into fixed gears being rotatable integrally with the relevant support shaft (each of the shafts 28, 29), free gears being mutually rotatable in relation to the support shaft, and slide gears being integrally rotatable and axially movable in relation to the shaft.

More specifically, the drive gears 48a, 48b are fixed gears, the drive gears 48c, 48d are slide gears and the drive gears 48e, 48f are free gears. In addition, the driven gears 49a to 49d are free gears, and the driven gears 49e, 49f are slide gears. Hereinafter, the gears 48c, 48d, 49e, 49f will in some cases be referred to as the slide gears, and the gears 48e, 48f, 49a to 49d will in some cases be referred to as the free gears.

Then, with arbitrary ones of the slide gears being appropriately slid (moved in the axial direction) by the change mechanism 24, power transmission by use of the speed change gear pair corresponding to one of the gear position is enabled.

On one side of the slide gears 48c, 48d, slide rings Sc, Sd, being integrally rotatable and axially movable in relation to the relevant support shaft in the same manner as the slide gears 48c, 48d, are provided integrally with the latter. The slide rings Sc, Sd are provided axially adjacently to the free gears 48e, 48f, respectively. The slide rings Sc, Sd are provided respectively with slide-side dogs (dowels) D1c, D1d, whereas the free gears 48e, 48f are provided respectively with free-side dogs (dowels) D1e, D1f corresponding respectively to the slide-side dogs D1c, D1d.

In addition, on one side of the slide gears 49e, 49f, slide rings Se, Sf, being integrally rotatable and axially movable in relation to the relevant support shaft in the same manner as the slide gears 49e, 49f, are provided integrally with the latter. The slide rings Se, Sf are provided axially adjacently to the free gears 49c, 49d, respectively. The slide rings Se, Sf are provided respectively with slide-side dogs (dowels) D2e, D2f, whereas the free gears 49c, 49d are provided respectively with free-side dogs (dowels) D2c, D2d corresponding respectively to the slide-side dogs D2e, D2f.

Further, slide-side dogs (dowels) D3e, D3f are provided on the other side of the slide gears 49e, 49f and the free gears 49a, 49b axially adjacent to the slide-side dogs D3e, D3f are provided respectively with free-side dogs (dowels) D3a, D3b corresponding respectively to the slide-side dogs D3e, D3f.

The slide-side dog and the free-side dog are mutually non-rotatably engaged with each other when the corresponding slide gear (inclusive of the slide ring) and free gear come close to each other, and the engagement is canceled when the corresponding slide gear and free gear are separated away from each other.

Then, with one of the slide gears and the corresponding free gear being mutually non-rotatably engaged with each other through the dog, power transmission by selective use of one of the speed change gear pair between the main shaft 28 and the counter shaft 29 is enabled.

In addition, in the condition where the engagements between the slide gears and the corresponding free gears are all canceled (in the condition shown in FIG. 4), the power transmission between the shafts 28 and 29 is disabled. This condition is a neutral condition of the transmission 47.

As shown in FIG. 3, based not only on the data from the above-mentioned sensors but also on the data from a throttle valve position sensor TS for the throttle body 16, a side stand (or center stand) storage sensor (switch) SS, a wheel speed sensor WS for the front wheel 2 as well as, for example, a mode switch SW1, a gear selection switch SW2, and a neutral-drive changeover switch SW3 provided on the steering handle 4a, etc., the electronic control unit 42 controls the operations of the twin clutch type transmission 23 and the gear shift device 41, thereby changing the gear position (shift position) in the transmission 47.

The speed change mode selected by operating the mode switch SW1 includes a full-automatic mode in which the gear position in the transmission 47 is automatically changed over based on vehicle data such as vehicle speed (wheel speed) and engine speed, and a semi-automatic mode in which the gear position in the transmission 47 can be changed over only by operation of the selection switch SW2 based on the driver's will. The current speed change mode and gear position are displayed, for example, on a meter device M provided in the vicinity of the steering handle 4a. In addition, by operation of the neutral-drive switch SW3, the transmission 47 can be changed over between a condition where power transmission at a predetermined gear position is possible and the neutral condition.

In addition, symbol S2 denotes a vehicle speed sensor for detecting the rotating speed of the main shaft 28 (detecting the rotating speed of the drive gear 48e meshed with the driven gear 49e rotated as one body with the counter shaft 29) for detecting the vehicle speed, and symbol S3 denotes a rotating speed sensor for detecting the rotating speed of the primary driven gear 58 for detecting the engine speed (the rotating speed of the crankshaft 21). The electronic control unit 42 shares the data from the sensors with an ECU 42a for a fuel injection system.

As shown in FIG. 4, the twin clutches 26 have a structure in which the first clutch 51a linked to the speed change gear pairs for odd-ordinal gear positions is disposed on the right side (on the outer side in the vehicle width direction) in the clutch case 25, and the second clutch 51b linked to the speed change gear pairs for even-ordinal gear positions is disposed on the left side (on the inner side in the vehicle width direction) in the clutch case 25. The clutches 51a, 51b are each a wet-type multiple disk clutch having a plurality of clutch disks (clutch disks 61a, 61b and clutch plates 66a, 66b) overlapping alternately in the axial direction.

Each of the clutches 51a, 51b is of an oil hydraulic type in which the pressure plate 52a, 52b is displaced in the axial direction by a supply oil pressure supplied externally, thereby obtaining a predetermined engaging force. Each of the clutches 51a, 51b includes a return spring 53a, 53b for urging the pressure plate 52a, 52b toward the clutch disengaging side; the engaging-side oil pressure chamber 54a, 54b for exerting a pushing force toward the clutch engaging side on the pressure plate 52a, 52b and a disengaging-side oil pressure chamber 55a, 55b for exerting a pushing force toward the clutch disengaging side on the pressure plate 52a, 52b so as to assist the returning motion of the latter.

Each of the disengaging-side oil pressure chambers 55a, 55b is normally supplied with a comparatively low oil pressure from the above-mentioned main oil pump, and the engaging-side oil pressure chambers 54a, 54b are selectively and individually supplied with a comparatively high oil pressure from the oil pressure supply system 46 (the clutch oil pump 32).

The clutches 51a, 51b share the single clutch outer 56 with each other and are configured to be substantially equal in diameter. The clutch outer 56 is in the shape of a bottomed cylinder opened to the right side, and a central part of a bottom part thereof is mutually rotatably supported by an intermediate part in the left-right direction of the outer shaft 44. A clutch center 57a for the first clutch 51a is disposed on the left inner side of the clutch outer 56, whereas a clutch center 57b for the second clutch 51b is disposed on the right inner side of the clutch outer 56. The clutch center 57a is integrally rotatably supported on a right end part of the inner shaft 43, whereas the clutch center 57b is integrally rotatably supported on a right end part of the outer shaft 44.

The primary driven gear 58 is mounted to the left side of a bottom part of the clutch outer 56, with a spring damper 59 therebetween, and the primary driven gear 58 is meshed with the primary drive gear 58a of the crankshaft 21. Therefore, a rotational power of the crankshaft 21 is inputted to the clutch outer 56 through the spring damper 59. The clutch outer 56 is rotated attendant on the rotation of the crankshaft 21 and separately from the main shaft 28.

A drive sprocket 56b for driving each oil pump is integrally rotatably provided on the left side, relative to the primary driven gear 58, of the clutch outer 56. A plurality of the clutch plates 61a for the first clutch 51a are integrally rotatably supported on the right inner periphery of the clutch outer 56, whereas a plurality of the clutch plates 61b for the second clutch 51b are integrally rotatably supported on the left inner periphery of the clutch outer 56.

The clutch outer 56 is provided in its outer periphery with a plurality of engaging grooves along the axial direction, whereas the clutch plates 61a, 61b are each provided at the outer periphery thereof with a plurality of engaging projections corresponding to the engaging grooves, and the engaging projections are mutually non-rotatably engaged with the engaging grooves, whereby the clutch plates 61a, 61b are integrally rotatably supported on the clutch outer 56.

A flange part 64a on the left side of the clutch center 57a of the first clutch 51a is provided with an inner wall part 65a erected to the right, and a plurality of the clutch disks (friction plates) 66a are integrally rotatably supported on the outer periphery of the inner wall part 65a.

The clutch center 57a is provided in its outer periphery with a plurality of engaging grooves along the axial direction, each of the clutch disks 66a is provided at its inner periphery with a plurality of engaging projections corresponding to the engaging grooves, and the engaging projections are mutually non-rotatably engaged with the engaging grooves, whereby the clutch disks 66a are integrally rotatably supported on the clutch center 57a.

The above-mentioned pressure plate 52a is oppositely disposed on the right side of the flange part 64a, and, between the outer periphery side of the pressure plate 52a and the outer periphery side of the flange part 64a, the above-mentioned clutch plates 61a and clutch disks 66a are disposed in a state of being alternately stacked in the axial direction.

Between the inner periphery side of the pressure plate 52a and the inner periphery side of the flange part 64a, the above-mentioned disengaging-side oil pressure chamber 55a is formed and the return spring 53a for urging the pressure plate 52a to the right side (to the side for spacing away from the flange part 64a, i.e., to the clutch disengaging side) is disposed.

A support flange part 67a provided at the outer periphery of a central tubular part 62a on the right side of the clutch center 57a is oppositely disposed on the right side of the inner periphery side of the pressure plate 52a. Between the support flange part 67a and the inner periphery side of the pressure plate 52a, the above-mentioned engaging-side oil pressure chamber 54a is formed and the return spring 53a is disposed.

On the other hand, a flange part 64b on the left side of the clutch center 57b of the second clutch 51b is provided with an inner wall part 65b erected to the right, and a plurality of the clutch disks 66b are integrally rotatably supported on the outer periphery of the inner wall part 65b.

The clutch center 57b is provided in its outer periphery with a plurality of engaging grooves along the axial direction, each of the clutch disks 66b is provided at its inner periphery with a plurality of engaging projections corresponding to the engaging grooves, and the engaging projections are mutually non-rotatably engaged with the engaging grooves, whereby the clutch disks 66b are integrally rotatably supported on the clutch center 57b.

The above-mentioned pressure plate 52b is oppositely disposed on the right side of the flange part 64b, and, between the outer periphery side of the pressure plate 52b and the outer periphery side of the flange part 64b, the above-mentioned clutch plates 61b and clutch disks 66b are disposed in the state of being alternately stacked in the axial direction.

Between the inner periphery side of the pressure plate 52b and the inner periphery side of the flange part 64b, the above-mentioned disengaging-side oil pressure chamber 55b is formed and a return spring 53b for urging the pressure plate 52b to the right side (to the side for spacing away from the flange part 64b, i.e., to the clutch disengaging side) is disposed.

A support flange part 67b provided at the outer periphery of a central tubular part 62b on the right side of the clutch center 57b is oppositely disposed on the right side on the inner periphery side of the pressure plate 52b. Between the support flange part 67b and the inner periphery side of the pressure plate 52b, the above-mentioned engaging-side oil pressure chamber 54b is formed and the return spring 53b is disposed.

A clutch cover 69 constituting the right side of the above-mentioned clutch case 25 is provided with a first supply oil passage 92a, a second supply oil passage 92b, and an in-cover main supply oil passage 71a. In addition, oil passages communicating individually with the oil passages 92a, 92b, 71a are appropriately formed in a right hollow part 43a of the inner shaft 43.

As a result, oil pressure from the clutch oil pump 32 can be supplied through the first supply oil passage 92a and the like into the engaging-side oil pressure chamber 54b of the second clutch 51b, oil pressure from the above-mentioned main oil pump can be supplied through the in-cover main supply oil passage 71 and the like into the disengaging-side oil pressure chamber 55a of the first clutch 51a, and oil pressure from the clutch oil pump 32 can be supplied through the second supply oil passage 92b and the like into the engaging-side oil pressure chamber 54a of the first clutch 51a. In addition, the disengaging-side oil pressure chamber 55b of the second clutch 51b can be supplied with oil pressure from the main oil pump through the main supply oil passage 71 and the like.

In the condition where the engine is stopped (in the condition where the oil pumps are stopped), the clutches 51a, 51b are in the disengaged condition wherein the pressure plates 52a, 52b are displaced to the right side by the urging forces of the return springs 53a, 53b, and the frictional engagement between the clutch plates 61a, 61b and the clutch disks 66a, 66b is canceled. In addition, in the condition where the engine is in operation and the supply of the oil pressure from the oil pressure supply system 46 is stopped, the urging forces of the return springs 53a, 53b and the oil pressures in the disengaging-side oil pressure chambers 55a, 55b act on the pressure plates 52a, 52b, whereby the clutches 51a, 51b are again put in the disengaged condition.

On the other hand, in the condition where the engine is operating and a comparatively high oil pressure is supplied from the oil pressure supply system 46 into the engaging-side oil pressure chamber 54a in the first clutch 51a, the pressure plate 52a is moved to the left side (to the flange part 64a side, i.e., to the clutch engaging side) against the oil pressure in the disengaging-side oil pressure chamber 55a and the urging force of the return spring 53a, and the clutch plates 61a and the clutch disks 66a are pressed into frictional engagement with each other, resulting in the clutch engaged condition wherein torque transmission between the clutch outer 56 and the clutch center 57a is possible.

Similarly, in the condition where the engine is operating and a comparatively high oil pressure is supplied from the oil pressure supply system 46 into the engaging-side oil pressure chamber 54b in the second clutch 51b, the pressure plate 52b is moved to the left side (to the flange part 64b side, i.e., to the clutch engaging side) against the oil pressure in the disengaging-side oil pressure chamber 55b and the urging force of the return spring 53b, and the clutch plate 61b and the clutch disks 66b are pressed into frictional engagement with each other, resulting in the clutch engaged condition wherein torque transmission between the clutch outer 56 and the clutch center 57b is possible.

In addition, when the supply of the oil pressure into the engaging-side oil pressure chamber 54a, 54b is stopped under the condition where the clutch 51a, 51b is in the engaged condition, the pressure plate 52a, 52b is displaced to the left side by the oil pressure in the disengaging-side oil pressure chamber 55a, 55b and the urging force of the return spring 53a, 53b, and the frictional engagement between the clutch plates 61a, 61b and the clutch disks 66a, 66b is canceled, resulting in the clutch disengaged condition wherein torque transmission between the clutch outer 56 and the clutch center 57a, 57b is impossible.

The engine oil supplied into the disengaging-side oil pressure chamber 55a, 55b of the clutch 51a, 51b is guided to the exterior of the oil pressure chamber through the oil passages formed appropriately in the inner wall part 65a, 65b and the like, thereby being appropriately supplied to the clutch plates 61a, 61b and the clutch disks 66a, 66b at the outer periphery of the inner wall part 65a, 65b. By thus relieving the working oil present in the disengaging-side oil pressure chamber 55a, 55b, the oil pressure inside the disengaging-side oil pressure chamber 55a, 55b is kept at a predetermined low pressure, and the lubrication performance and the cooling performance in regard of the clutch plates 61a, 61b and the clutch disks 66a, 66b in the clutch 51a, 51b in the disengaged condition are enhanced.

In the twin clutch type transmission 23, in the case where the motorcycle 1 is judged as being stopped on the basis of the side stand being erecting or the like fact even after the engine is started, both of the clutches 51a and 51b are kept in the disengaged condition. Then, when for example the side stand is stored or the switch SWA, SW2 or SW3 is operated, the transmission 47 is shifted from the neutral condition to a 1st gear speed condition such as to enable power transmission by use of the 1st gear (starting gear, i.e., the speed change gear pair 45a) as a preparation for starting the motorcycle 1, and, when for example the engine speed is raised starting from this condition, the first clutch 51a is brought through a half-clutch condition into the engaged condition, whereby the motorcycle 1 is started.

During the operation of the motorcycle 1, only one of the clutches 51a, 51b is in the engaged condition depending on the current shift positions thereof, whereas the other is kept disengaged. As a result, power is transmitted through one of the inner and outer shafts 43, 44 and one of the speed change gear pairs 45a to 45f. In this case, the electronic control unit 42 controls the operation of the twin clutch type transmission 23 on the basis of vehicle data, so as to preliminarily prepare a condition where power transmission by use of a speed change gear pair corresponding to the next shift position is possible.

More specifically, where the current shift position (gear position) is for example an odd-ordinal gear position (or even-ordinal gear position), the next shift position is an even-ordinal gear position (or odd-ordinal gear position). In this case, therefore, a condition where power transmission by use of a speed change gear pair for the even-ordinal gear position (or odd-ordinal gear position) is possible is preliminarily developed.

In this instance, the first clutch 51a is in the engaged condition, but the second clutch 51b (or the first clutch 56a) is in the disengaged condition, so that the engine output (the rotational power of the crankshaft 21) is not transmitted to the outer shaft 44 (or the inner shaft 43) and the speed change gear pair for the even-ordinal gear position (or odd-ordinal gear position).

Thereafter, when the electronic control unit 42 judges that a timing for gear shift is reached, the first clutch 51a (or the second clutch 51b) is disengaged and the second clutch 51b (or the first clutch 51a) is engaged, simply, whereby the power transmission is changed over to one for transmitting power by use of the speed change gear pair corresponding to the next shift position which has preliminarily been selected. Accordingly, it is possible to achieve a swift and smooth speed change, without any time lag in speed change and without any interruption of power transmission.

Figure 6:
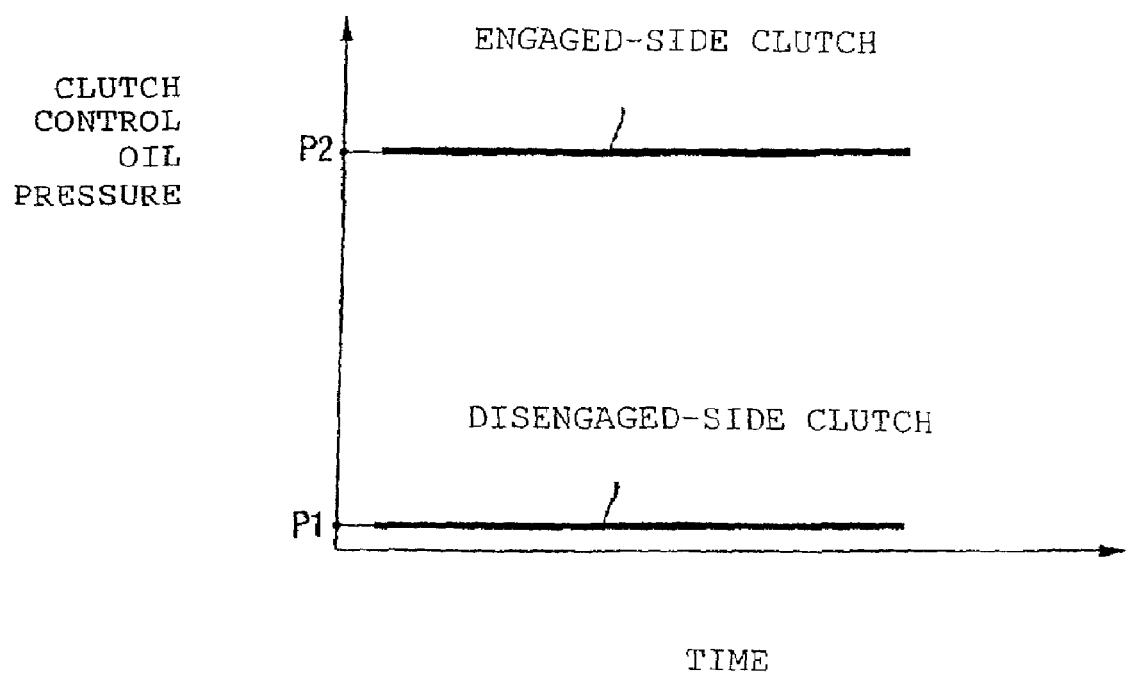
FIG. 6 is a graph showing the condition in which clutch control oil pressures in the twin clutch type speed change control system are supplied.

Here, as shown in FIG. 6, during a normal operation with a fixed gear position of the transmission 47, a minute oil pressure P1 is supplied into the engaging-side oil pressure chamber of the clutch (51a or 51b) which is in the disengaged condition, whereby the clutch is moved by a minute amount to the engaging side. In addition, the minimum oil pressure P1 means an oil pressure of not less than the minimum oil pressure necessary for reducing the mechanical play in the clutch (an oil pressure of not less than the oil pressure corresponding to the force of the return spring in the clutch).

During a normal operation with a fixed gear position, in the clutch in the engaged condition (engaged-side clutch), component parts on the crankshaft 21 side (the component parts rotated as one body with the primary driven gear 58, i.e., the clutch outer 56, and the clutch plates 61a, 61b, and the like) and component parts on the transmission 47 side (the component parts rotated as one body with the main shaft 28, i.e., the clutch center 57a or 57b, and the clutch disks 66a, 66b, and the like) are rotated integrally with each other.

On the other hand, during the normal operation, in the clutch in the disengaged condition (disengaged-side clutch), component parts on the crankshaft 21 side are rotated idly in relation to component parts on the side of the transmission 47 being in the stopped state.

In the clutches 51a, 51b, during when the driving force (torque) is not being transmitted, mechanical play (clearances) in the rotating direction are present between the engaging grooves in the outer periphery of the clutch outer 56 and the engaging projections at the outer peripheries of the clutch plates 61a, 61b and between the engaging grooves in the outer peripheries of the clutch centers 57a, 57b and the engaging projections at the inner peripheries of the clutch disks 66a, 66b. However, through the above-mentioned process in which the clutch being in the disengaged condition is moved by a minute amount toward the clutch engaging side, a minute torque is given from the components on the side of the crankshaft 21 to the component parts on the side of the transmission 47, whereby the plays in the rotating direction are reduced.

As has been described above, the twin clutch type speed change control system in the embodiment above includes the transmission 47 having the plurality of speed change gear pairs 45a to 45f for odd-ordinal gear positions and even-ordinal gear positions, and the pair of oil hydraulic type multiple disk clutches 51a, 51b linked respectively to both the odd-ordinal and even-ordinal gear position speed change gear pairs, the transmission 47 being capable of power transmission by selectively using one of the speed change gear pairs and one of the clutches 51a, 51b being engaged and the other being disengaged during a normal operation with a fixed gear position so as to transmit power by use of one of the speed change gear pairs linked to the engaged clutch and to develop a condition where power transmission can be performed by use of a preliminarily selected one of the speed change gear pairs linked to the disengaged clutch. Starting from this condition, the engaged clutch being disengaged and the disengaged clutch being engaged so as thereby to perform changeover between the odd-ordinal gear position and the even-ordinal gear position, wherein during the normal operation, the clutch being in the disengaged condition is supplied with a minute oil pressure P1 toward the clutch engaging side, whereby the clutch is moved by a minute amount toward the clutch engaging side.

According to this configuration, during the normal operation with a fixed gear position, the clutch being in the disengaged condition is moved by a minute amount toward the clutch engaging side, whereby the plays in the rotating direction between the component parts on the crankshaft 21 side of the clutch and the component parts on the transmission 47 side of the clutch can be reduced, so that the sound based on the plays during the normal operation can be reduced.

In addition, the present invention is not limited to the above embodiment. For example, each of the clutches 51a, 51b may be a clutch which gets an engaging force or an operating force from a spring, a motor, a solenoid or the like, and may be a dry type clutch or a single disk clutch.

In addition, the engine 13 may be a single-cylinder engine, a V-type engine, a horizontal opposed type engine, or the like, and may be a longitudinal type engine having a crankshaft laid along the vehicle front-rear direction, or the like.

Further, the transmission 47 may be one in which a slide member separate from gears is slid to thereby change over the gear position, and the number of speeds may be less than six or not less than seven.

Moreover, the vehicle is not limited to a motorcycle, and may be a saddle ride type vehicle with three or four wheels. Or, the present invention may be applied to a motor scooter type vehicle having a low-floor foot rest part.

In addition, the configurations in the above embodiment constitute merely an example of the present invention. Naturally, the present invention is applicable to four-wheel passenger cars and the like, and various modifications are possible within the scope of the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A twin clutch type speed change control system comprising:
    a transmission mechanism having a plurality of gear trains for odd-ordinal gear positions and even-ordinal gear positions, and a pair of clutches linked respectively to both said odd-ordinal and even-ordinal gear position gear trains;
    said transmission mechanism being capable of power transmission by selectively using one of said gear trains; and
    one of said clutches being engaged and the other of said clutches being disengaged during a normal operation with a fixed gear position so as to transmit power by use of one of said gear trains linked to said engaged clutch and to develop a condition where power transmission can be performed by use of a preliminarily selected one of said gear trains linked to said disengaged clutch, and, starting from this condition, said engaged clutch being disengaged and said disengaged clutch being engaged so as to perform changeover between said odd-ordinal gear position and said even-ordinal gear position;
    wherein during said normal operation, said formerly disengaged clutch is moved by a minute amount toward the clutch engaging side,
    wherein each of the clutches includes:
        a clutch center, and
        a pressure plate and a flange support part disposed on a right side of the clutch center,
    wherein the pressure plate and flange support part in the one of the clutches are structured and configured in a substantially equivalent manner to that in the other of the clutches.

2. The twin clutch type speed change control system as set forth in claim 1, wherein each of said clutches is an oil hydraulic clutch which exhibits an engaging force based on an oil pressure supplied externally, and, during said normal operation, said disengaged clutch is supplied with a minute oil pressure toward the clutch engaging side.

3. The twin clutch type speed change control system as set forth in claim 1, wherein each of said clutches is a multiple disk clutch having a plurality of clutch disks.

4. The twin clutch type speed change control system as set forth in claim 1, wherein the clutch center of each of said clutches includes a flange part on a left side thereof,
    each of the clutches further comprising:
        a disengaging-side oil pressure chamber located between the flange part and the pressure plate, and
        an engaging-side oil pressure chamber located between the flange part and the flange support part, the engaging-side oil pressure chamber being in a position that is directly inward in a radial direction with respect to a clutch disk at the right side of each of the clutches.

5. The twin clutch type speed change control system as set forth in claim 1, and further including a change mechanism for power transmission between a main shaft and a counter shaft for change over therebetween.

6. The twin clutch type speed change control system as set forth in claim 5, wherein the change mechanism moves in an axial direction a plurality of shift forks by rotation of a shift drum for power transmission between the main shaft and the counter shaft for change over therebetween.

7. The twin clutch type speed change control system as set forth in claim 1, wherein each of the twin clutches share a single clutch outer with each other and are configured to be substantially equal in diameter relative to each other.

8. The twin clutch type speed change control system as set forth in claim 7, wherein the clutch outer is in the shape of a bottomed cylinder opened to a right side and a central portion of a bottom part thereof is mutually rotatably supported by an intermediate portion in a left-right direction of an outer shaft.

9. The twin clutch type speed change control system as set forth in claim 8, wherein the clutch outer is rotated attendant on the rotation of a crankshaft and is separated from a main shaft.

10. The twin clutch type speed change control system as set forth in claim 1, wherein during normal operation with a fixed gear position the clutch in the disengaged condition is moved by a minute amount toward the clutch engaging side whereby the play in the rotating direction between the components parts on a crankshaft side of the clutch and the component parts on the transmission side of the clutch can be reduced for reducing a sound generated during the play in the component parts.

11. A twin clutch type speed change control system comprising:
    a transmission mechanism comprising:
        a plurality of gear trains for odd-ordinal gear positions and even-ordinal gear positions; and
        a pair of clutches linked respectively to both said odd-ordinal and even-ordinal gear position gear trains;
    said transmission mechanism being capable of power transmission by selectively using one of said gear trains; and
    one of said clutches being engaged and the other of said clutches being disengaged during a normal operation with a fixed gear position so as to transmit power by use of one of said gear trains linked to said engaged clutch and to develop a condition where power transmission can be performed by use of a preliminarily selected one of said gear trains linked to said disengaged clutch, and, starting from this condition, said engaged clutch being disengaged and said disengaged clutch being engaged so as to perform changeover between said odd-ordinal gear position and said even-ordinal gear position;

wherein during said normal operation, said formerly disengaged clutch is moved by a minute amount toward the clutch engaging side for reducing play in the rotating direction between component parts on a crankshaft side of the twin clutches and component parts on the transmission side of the twin clutches for reducing a sound generated during play of the component parts, wherein each of the clutches includes:
   a clutch center, and
   a pressure plate and a flange support part disposed on a right side of the clutch center,
     wherein the pressure plate and flange support part in the one of the clutches are structured and configured in a substantially equivalent manner to that in the other of the clutches.

12. The twin clutch type speed change control system as set forth in claim 11, wherein each of said clutches is an oil hydraulic clutch which exhibits an engaging force based on an oil pressure supplied externally, and, during said normal operation, said disengaged clutch is supplied with a minute oil pressure toward the clutch engaging side.

13. The twin clutch type speed change control system as set forth in claim 11, wherein each of said clutches is a multiple disk clutch having a plurality of clutch disks.

14. The twin clutch type speed change control system as set forth in claim 11, wherein the clutch center of each of said clutches includes a flange part integrally formed on a left side thereof, each of the clutches further comprising:
   a disengaging-side oil pressure chamber located between the flange part and the pressure plate, and
   an engaging-side oil pressure chamber located between the pressure plate and the flange support part, the engaging-side oil pressure chamber being in a position that is directly inward in a radial direction with respect to a clutch disk at the right side of each of the clutches.

15. The twin clutch type speed change control system as set forth in claim 11, and further including a change mechanism for power transmission between a main shaft and a counter shaft for change over therebetween.

16. The twin clutch type speed change control system as set forth in claim 15, wherein the change mechanism moves in an axial direction a plurality of shift forks by rotation of a shift drum for power transmission between the main shaft and the counter shaft for change over therebetween.

17. The twin clutch type speed change control system as set forth in claim 11, wherein each of the twin clutches share a single clutch outer with each other and are configured to be substantially equal in diameter relative to each other.

18. The twin clutch type speed change control system as set forth in claim 17, wherein the clutch outer is in the shape of a bottomed cylinder opened to a right side and a central portion of a bottom part thereof is mutually rotatably supported by an intermediate portion in a left-right direction of an outer shaft.

19. The twin clutch type speed change control system as set forth in claim 18, wherein the clutch outer is rotated attendant on the rotation of a crankshaft and is separated from a main shaft.

20. The twin clutch type speed change control system as set forth in claim 1, wherein the clutch center for each of the clutches includes a central tubular part extending in an axial direction further toward the right side of the clutch than either of the pressure plate and the flange support part.

\* \* \* \* \*